UNITED STATES PATENT OFFICE.

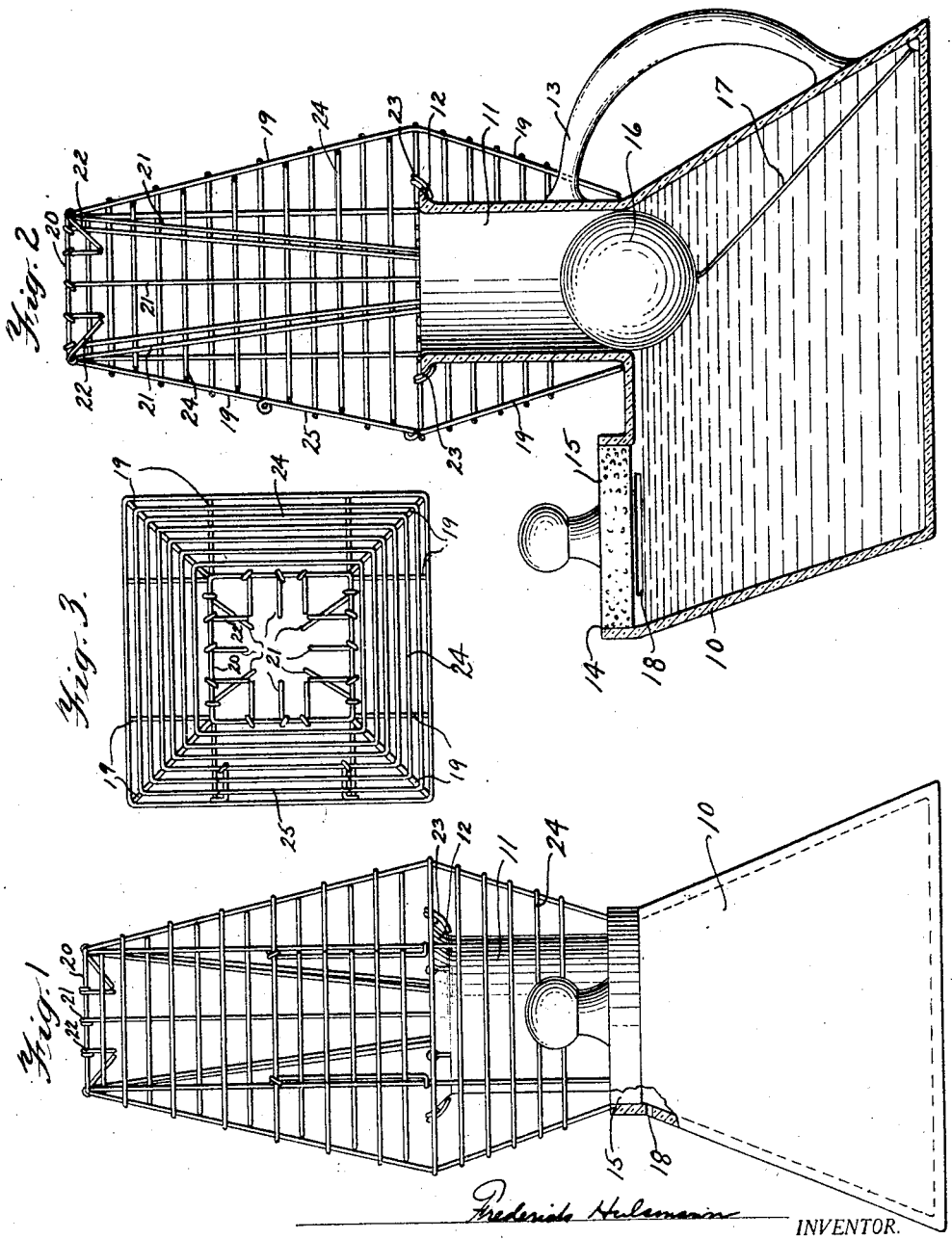

FREDERIC HULSMANN, OF PELHAM, NEW YORK.

ANIMAL-TRAP.

1,381,464.   Specification of Letters Patent.   Patented June 14, 1921.

Application filed October 9, 1920. Serial No. 415,866.

*To all whom it may concern:*

Be it known that I, FREDERIC HULSMANN, a citizen of the United States, residing at Pelham, in the county of Westchester and State of New York, have invented certain new and useful Improvements in Animal-Traps, of which the following is a specification.

My invention relates to traps for animals, particularly one useful in the capture of rats and mice. One of the objects of my invention is to provide a trap which will kill the animal and at the same time make the disposition of the body comparatively easy and cleanly. Another object of my invention is to provide such a trap which is easy to bait and to clean, and yet one which will be effective in capturing the animal. With these and other objects in view, my invention consists in the construction and arrangement hereinafter described and more specifically pointed out in the appended claims.

In the drawings, Figure 1 is a front elevation and Fig. 2 a vertical sectional elevation of a form of trap which I have adopted for purposes of illustration; Fig. 3 is a plan view of a part of the trap.

In the several views corresponding reference characters refer to corresponding parts.

Referring now to the illustrative form of my invention, 10 is a receptacle which may be made of any suitable material, preferably of glass or porcelain. The body of this receptacle is made sufficiently large to contain the body of the animal to be captured and also sufficient fluid, such as water, to drown the animal.

The top of the receptacle 10 is provided with a neck 11, preferably flared out at the top, as at 12, and is also conveniently provided with a handle 13. At the top there is provided another opening 14 having a closure, such as a cork 15, supplied with an appropriate handle. Within the receptacle 10 and arranged to fit into the entrance from the receptacle to the neck 11 is a ball float 16, to which is attached a flexible cable 17 connected at some lower portion of the receptacle 10. An overflow opening, such as a slot 18, is provided near the top of the receptacle 10.

The parts so far described are arranged in such a way that when the receptacle is filled with water to the level determined by the overflow opening 18, the ball float 16 will rise in the entrance of the neck 11. The overflow 18 is provided so that when the animal pushes down the float 16 and falls into the receptacle 10 the water displaced by his body will flow out of the overflow opening. If preferred, a compartment may be provided on the side of the receptacle 10 to receive this overflow water. The opening 14 is made sufficiently large so that when the stopper 15 is withdrawn the animal may be readily poured out of the receptacle. If desired, suitable means may be provided for holding the stopper 15 in place.

As a convenient means for inducing the animal to enter the neck 11 I provide a runway vertically arranged above the top of the neck, this runway extending a convenient distance above the top of the neck and preferably having an approach by which the animal may climb to the entrance to the runway. For convenience of manufacture I combine these two parts in the manner shown by means of the wire work illustrated.

In the form illustrated, I have provided a plurality of wires 19 extending upwardly from the top of the receptacle 10 to some convenient distance above the top of the neck 11. At the upper end of the wires 19 is a wire 20 which may be formed into any convenient shape, the form shown being square. Extending downwardly from the wire 20 is a series of inwardly extending wires 21, which may be prolonged into the neck 11 as far as desired. Also attached to the wire 20 is a series of inwardly extending prongs 22 by means of clips 23 attached to wires extending horizontally from the wires 19 across the top of the neck 11, the structure being attached to the flanged portion 12 of the neck. If desired, these clips may be arranged so as to be snapped open and shut whereby the wire structure may be removed from the receptacle 10 for cleaning purposes. Surrounding the wires 19 is a series of horizontal wires 24 forming a kind of cage or a ladder. A door 25 is arranged on one side of the wire structure whereby access to the top of the neck 11 may be had.

In operation, the door 25 is open and bait placed on the top of the neck 11 and the door then closed. The animal in seeking to obtain this bait, and not being able to reach it through the wires 24, will climb up such wires to the wire 20 and pass from there downward into the interior of the cage, the inwardly projecting wires 21 yielding to permit the passage of his body. The prongs 22 and the ends of the wires 21, if the animal passes beyond them, will each act to prevent his retreat from the runway. As soon as his body rests on the float 16 the latter will sink and permit the animal to fall into the water receptacle 10. The float 16 will then rise to its normal position and the animal will be drowned. To remove the animal all that is necessary is to remove the stopper 15 and throw the animal and the water out, when the receptacle may be refilled and be again ready for operation. The cable 17 limits the motion of the float 16 so that when the receptacle is again filled, the float will necessarily rise into the entrance to the neck 11.

It will be understood that the construction of the runway may be varied within wide limits, and that the shape of the receptacle may also be widely varied.

While I preferably make the runway vertical throughout, it will be understood that the entrance thereto need not necessarily be directly above the receptacle opening. The runway may be straight but inclined somewhat and, indeed, it may be vertical for only a short distance above the opening and then be curved until the beginning of the runway is substantially horizontal.

I claim:

1. In an animal trap, a fluid receptacle having an opening in its top, a float to close said opening when the receptacle is filled with fluid, and a vertically arranged runway above the float.

2. In an animal trap, a fluid receptacle having an opening in its top, a float to close said opening when the receptacle is filled with fluid, and a vertically arranged runway above the float, said runway being provided with means by which the animal may climb to the upper entrance of the runway, and with prongs to prevent the retreat of the animal from the runway.

3. In an animal trap, a fluid receptacle having an opening in its top, a float to close said opening when the receptacle is filled with fluid, and a vertically arranged runway above the float, and an approach to the upper end of the runway, said runway and approach being formed of wires supported on said receptacle.

4. In an animal trap, a fluid receptacle having an opening in its top, a float to close said opening when the receptacle is filled with fluid, and a vertically arranged runway above the float, said receptacle having a second opening normally closed and arranged to permit the fluid and animal therein to be poured out of the receptacle.

5. In an animal trap, a fluid receptacle having an opening in its top, a float to close said opening when the receptacle is filled with fluid, a vertically arranged runway above the float and a flexible cable connecting the float to the receptacle and adapted to prevent the float being moved out of position to rise into said openings.

6. In an animal trap, a fluid receptacle having an opening in its top, a float to close said opening when the receptacle is filled with fluid, and a vertically arranged runway above the float, said receptacle having an overflow opening near its top whereby the receptacle may be filled with fluid to hold the float in position and to permit the surplus fluid to flow out when an animal enters the receptacle.

7. In an animal trap, a fluid receptacle having on its top a neck-like projection open at the top, a float in the receptacle arranged to close the entrance from the neck to the receptacle when the receptacle is filled with fluid, and a runway and an approach thereto formed of wires and located above and surrounding the neck.

8. In an animal trap, a fluid receptacle having on its top a neck-like projection open at the top, a float in the receptacle arranged to close the entrance from the neck to the receptacle when the receptacle is filled with fluid, and a runway and an approach thereto formed of wires and located above and surrounding the neck, the top of the neck being arranged to receive bait and said approach being provided with a door to give access to the top of the neck.

FREDERIC HULSMANN.